(12) United States Patent
Liu et al.

(10) Patent No.: US 10,809,959 B2
(45) Date of Patent: Oct. 20, 2020

(54) MULTI-SCREEN DISPLAY DEVICE

(71) Applicant: CHAMP VISION DISPLAY INC., Chu-Nan, Miaoli County (TW)

(72) Inventors: Chin-Ku Liu, Chu-Nan (TW); Jhong-Hao Wu, Chu-Nan (TW)

(73) Assignee: CHAMP VISION DISPLAY INC., Chu-Nan (TW)

( * ) Notice: Subject to any disclaimer, the term of this patent is extended or adjusted under 35 U.S.C. 154(b) by 0 days.

(21) Appl. No.: 16/162,342

(22) Filed: Oct. 16, 2018

(65) Prior Publication Data

US 2019/0121593 A1 Apr. 25, 2019

(30) Foreign Application Priority Data

Oct. 25, 2017 (TW) .............................. 106136794 A

(51) Int. Cl.
*G09G 5/00* (2006.01)
*G06F 3/14* (2006.01)
(Continued)

(52) U.S. Cl.
CPC ........... *G06F 3/1423* (2013.01); *G02B 5/045* (2013.01); *G02B 5/30* (2013.01); *G02B 6/0038* (2013.01);
(Continued)

(58) Field of Classification Search
CPC ......... G09G 2300/026; G09G 2380/02; G09G 2300/0426; G09G 2320/0233; G09G 2320/028; G02B 6/0053; G02B 5/045; G02B 6/0078; G02B 6/008; G02B 6/0088; G06F 3/1423; G06F 3/1446; G06F 21/32; G06F 21/35; G06F 3/0346; G06F 3/013; G06F 3/0425; G06F 16/00; G06F 1/163;
(Continued)

(56) References Cited

U.S. PATENT DOCUMENTS 7,134,778 B2 11/2006 Kazuhiro et al.
8,619,210 B2 * 12/2013 Watanabe ................. G09F 9/30
345/102

(Continued)

FOREIGN PATENT DOCUMENTS

CN 1661444 A 8/2005
CN 201502963 U 6/2010
(Continued)

*Primary Examiner* — Duc Q Dinh

(57) ABSTRACT

A multi-screen display device includes a plurality of display screens and a prism-structured optical element disposed between two adjacent display screens. The prism-structured optical element includes a substrate and a plurality of prisms arranged in a predetermined direction on the substrate. The substrate includes a first region and a second region adjacent to each other, and the lengths of the first and second regions in the predetermined direction are respectively La and Lb, and La≥Lb. The prism includes a plurality of first and second prisms in the first and second regions respectively. Each first and second prism has internal angles θa1, θa2 and internal angles θb1 and θb2 adjacent to the substrate. The inner angle θa1 is between the inner angle θa2 and the second region, and θa1<θa2. The internal angle θb1 is between the internal angle θb2 and the first region, and θb1<θb2.

12 Claims, 16 Drawing Sheets

(51) Int. Cl.
*G02B 5/04* (2006.01)
*F21V 8/00* (2006.01)
*G09G 3/34* (2006.01)
*G02B 5/30* (2006.01)

(52) U.S. Cl.
CPC ..... *G09G 3/3406* (2013.01); *G09G 2300/026* (2013.01); *G09G 2380/02* (2013.01)

(58) Field of Classification Search
CPC .... G06F 1/1635; G06F 1/1652; G06F 1/1684; G06F 1/1694; G06F 1/203; G06F 21/83; G06F 3/012; G06F 3/017
USPC ..................................... 345/1.1–2.3, 1.1–1.3
See application file for complete search history.

(56) References Cited

U.S. PATENT DOCUMENTS

| | | | |
|---|---|---|---|
| 9,103,524 B2 * | 8/2015 | Geng | G06F 1/1609 |
| 9,612,468 B1 | 4/2017 | Liu et al. | |
| 9,851,480 B2 | 12/2017 | Liu et al. | |
| 10,012,857 B2 | 7/2018 | Liu et al. | |
| 10,067,369 B2 | 9/2018 | Liu et al. | |
| 2003/0231144 A1 * | 12/2003 | Cho | G02B 5/045 |
| | | | 345/1.3 |
| 2004/0071417 A1 | 4/2004 | Veligdan | |
| 2009/0059366 A1 | 3/2009 | Imai | |
| 2010/0277665 A1 | 11/2010 | Kuo et al. | |
| 2011/0164200 A1 | 7/2011 | Watanabe | |
| 2014/0218971 A1 | 8/2014 | Wu | |
| 2015/0092442 A1 | 4/2015 | Wu | |
| 2015/0116852 A1 | 4/2015 | Kim et al. | |
| 2017/0131583 A1 | 5/2017 | Liu et al. | |
| 2017/0131584 A1 | 5/2017 | Liu et al. | |
| 2018/0040281 A1 | 2/2018 | Liu et al. | |

FOREIGN PATENT DOCUMENTS

| | | |
|---|---|---|
| CN | 101206327 B | 11/2011 |
| CN | 102637388 A | 8/2012 |
| CN | 102854644 A | 1/2013 |
| CN | 202837794 U | 3/2013 |
| CN | 101593473 B | 6/2013 |
| CN | 102346326 B | 10/2013 |
| CN | 203644317 U | 6/2014 |
| CN | 103988118 A | 8/2014 |
| CN | 105100658 A | 11/2015 |
| CN | 102087814 B | 4/2016 |
| CN | 205485774 U | 8/2016 |
| CN | 106886253 A | 6/2017 |
| JP | 2008060061 A | 3/2008 |
| JP | 2013195458 A | 9/2013 |
| TW | 200541334 A | 12/2005 |
| TW | 200846774 A | 12/2008 |
| TW | M358323 U | 6/2009 |
| TW | 200938913 A | 9/2009 |
| TW | 201024977 A1 | 7/2010 |
| TW | 201319685 A1 | 5/2013 |
| TW | 201341864 A | 10/2013 |
| TW | 201403177 A | 1/2014 |
| TW | 201432351 A | 8/2014 |
| TW | 201447836 A | 12/2014 |
| TW | 201513074 A | 4/2015 |
| TW | I507787 B | 11/2015 |
| TW | 201610960 A | 3/2016 |
| TW | 201706976 A | 2/2017 |
| WO | 2010124542 A1 | 11/2010 |
| WO | 2013134621 A1 | 9/2013 |
| WO | 2015133488 A1 | 9/2015 |

\* cited by examiner

MULTI-SCREEN DISPLAY DEVICE

CROSS-REFERENCE TO RELATED APPLICATION

THIS APPLICATION CLAIMS THE PRIORITY BENEFIT OF TAIWAN APPLICATION (TW106136794 FILED ON 2017 Oct. 25). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a display device, and more particularly to a multi-screen display device.

BACKGROUND OF THE INVENTION

Anyone who has used a multi-screen display device knows the convenience of a multi-screen display device. Because using the multi-screen can receive more messages from the screens at the same time to achieve rapid analysis and integration of the multiplex effect, the multi-screen display device has been widely used in specific industries such as stock and securities. For a general work, using the multi-screen can also help to improve work efficiency. In addition, the multi-screen output at the same time allows users to adjust the size of the image they want to watch, so as to enjoy different visual perception. Moreover, the current high-end graphics card almost supports all multi-screen output, thus after buying more than one screen, users can splicing out the desired display configuration, enjoy better viewing quality. In addition, in the audio and video entertainment market, multi-screen display is one of the key players wants to enjoy.

On the other hand, in the display industry, curved screens are considered as one of the key development projects. Because the curved screen has an immersed experience, the curved surface is designed so that the viewer feels as if he or she is surrounded by a zero dead angle, and the visual effect is more vivid when the depth of field becomes larger or the viewing distance becomes closer.

However, both the flat screen and the curved screen include a border around the display area. When using multi-screen splicing, the border at the splicing may affect viewing quality.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a multi-screen display device to improve the problem that the border of the screen affects the display quality.

Other objectives and advantages of the invention can be further understood from the technical features disclosed in the invention.

To achieve one or a part or all of the above objectives or other objectives, an embodiment of the invention provides a multi-screen display device, which includes a plurality of display screens and at least one prism-structure optical element. The display screens are arranged adjacent to each other. At least one adjacent two of the display screens have an included angle. The included angle is greater than 90 degrees and less than 180 degrees. Each of the display screens has a display area and a border surrounding the display area. Each of the prism-structure optical elements is disposed between the two adjacent display screens having the included angle and covers two adjacent side edges of the borders of the two display screens and a part of the display areas of the two display screens. Each of the prism-structured optical elements includes a substrate and a plurality of prisms. The prisms are arranged on the substrate in a predetermined direction. An extending direction of each of the prisms is substantially parallel to the two adjacent side edges. The substrate includes a first region and a second region adjacent to each other and corresponding to a part of the two display screens respectively. A length of the first region in the predetermined direction is La, a length of the second region in the predetermined direction is Lb, and La≥Lb. The prisms include a plurality of first prisms arranged in the first region and a plurality of second prisms arranged in the second region. Each of the first prisms has two interior angles θa1 and θa2 adjacent to the substrate. The interior angle θa1 is located between the interior angle θa2 and the second region, and θa1<θa2. Each of the second prisms has two interior angle θb1 and θb2 adjacent to the substrate. The interior angle θb1 is located between the inner angle θb2 and the first region, and θb1<θb2.

In summary, the multi-screen display device in accordance with the embodiment of the invention has the prism-structured optical element to cover two adjacent side edges of the borders and a part of the display areas of the two adjacent display screens. The prism-structured optical element can direct the light emitted from a part of the display area covered by the prism-structure optical element to the eyes of the viewer, so that the viewer is not easy to notice the borders between the two adjacent display screens and the prism-structured optical element when viewing an image formed by splicing a plurality of display screens, and thus improving the display quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
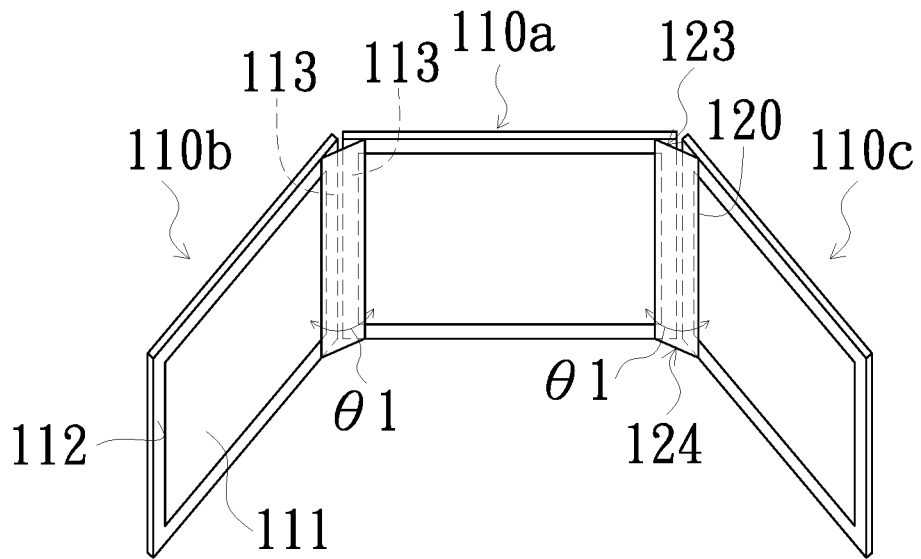
FIG. 1 is a schematic view of a multi-screen display device in accordance with an embodiment of the invention.

FIG. 1 is a schematic view of a multi-screen display device in accordance with an embodiment of the invention. Referring to FIG. 1. The multi-screen display device 100 of the embodiment includes a prism-structured optical element 120 and a plurality of display screens. FIG. 1 illustrates three display screens 110a, 110b and 110c as an example. The display screens 110a, 110b and 110c are arranged adjacent to each other. An included angle θ1 is formed between at least one two adjacent display screens of the display screens 110a, 110b and 110c, wherein the included angle θ1 is greater than 90 degrees and less than 180 degrees. In the embodiment, an included angle θ1 is formed between the two adjacent display screens 110a and 110b, and an included angle θ1 is also formed between the two adjacent display screens 110a and 110c. The angle of the included angle θ1 may be determined according to different design requirements. In an embodiment, the included angle θ1 is, for example, 130 degrees. In addition, each of the display screens 110a, 110b and 110c has a display area 111 and a border 112 surrounding the display area 111. The display screens 110a, 110b and 110c in the embodiment may be various types of display screens, such as a liquid crystal display screen and an organic light-emitting diode display screen, but not limited thereto. The display screens 110a, 110b and 110c may be a flat screen or a curved screen.

The prism-structured optical element 120 is disposed between the two adjacent display screens having the included angle θ1, for example, between the display screens 110a and 110b and between the display screens 110a and 110c. That is, the number of the prism-structured optical elements 120 may be one or more, and one prism-structured optical element 120 may be disposed between any two adjacent display screens having the included angle θ1. In other embodiments, it is to determine whether to dispose the prism-structured optical element 120 between two adjacent display screens having the included angle θ1 among the display screens according to design requirements. For example, the prism-structured optical element 120 is disposed between the display screens 110a and 110b but is not disposed between the display screens 110a and 110c. In addition, each prism-structured optical element 120 covers the two adjacent side edges 113 of the borders 112 of the corresponding two display screens and a part of the two display areas 111. For example, the prism-structured optical element 120 corresponding to the display screens 110a and 110b is disposed in a manner of being inclined with respect to the two adjacent side edges 113 of the display screens 110a and 110b and a part of the two display areas 111 of the display screens 110a and 110b respectively, so as to simultaneously cover the two adjacent side edges 113 of the borders 112 of the display screen 110a and 110b and a part of the two display areas 111 of the display screens 110a and 110b. The prism-structured optical element 120 corresponding to the display screens 110a and 110c is disposed in a manner of being inclined with respect to the two adjacent side edges 113 of the display screens 110a and 110c and a part of the two display areas 111 of the display screens 110a and 110c respectively, so as to simultaneously cover the two adjacent side edges 113 of the borders 112 of the display screen 110a and 110c and a part of the two display areas 111 of the display screens 110a and 110c. In other words, the prism-structured optical element 120 corresponding to the display screens 110a and 110b is neither parallel nor perpendicular to the display screens 110a and 110b and the prism-structured optical element 120 corresponding to the displays 110a and 110c is neither parallel nor perpendicular to the display screens 110a and 110c.

Figure 2:
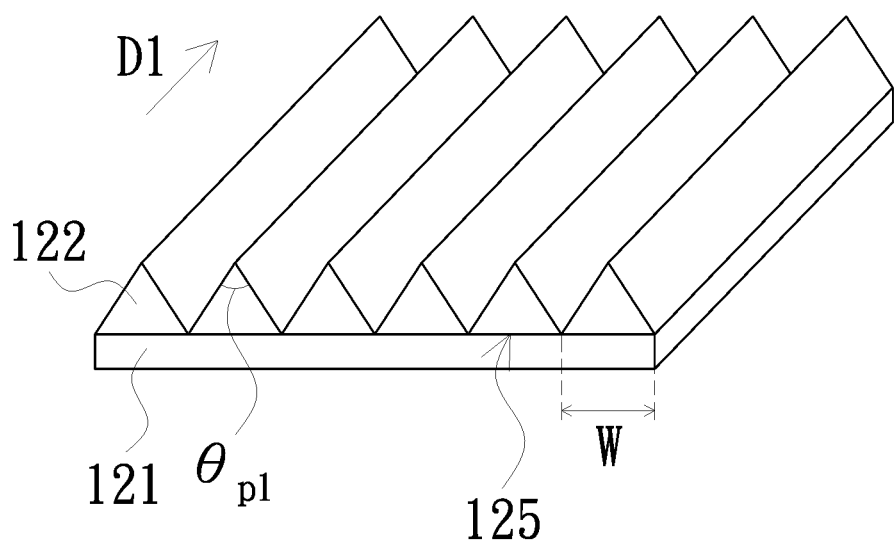
FIG. 2 is a schematic view of the prism-structured optical element of FIG. 1.

FIG. 2 is a stereoscopic schematic view of the prism-structured optical element in FIG. 1. Referring to FIGS. 1 and 2. The prism-structured optical element 120 includes a substrate 121 and a plurality of adjacent prisms 122 disposed on the substrate 121. The extending direction D1 of each prism 122 is substantially parallel to the two adjacent side edges 113 of the two borders 112 covered by the prism-structured optical element 120 in FIG. 1. That is, each prism 122 extends from the upper end 123 of the prism-structured optical element 120 to the lower end 124 in FIG. 1. The extending direction D1 of each prism 122 is parallel to the longitudinal side edge of the display area 111. In addition, the substrate 121 has, for example, a carrying surface 125 away from the two adjacent display screens (for example, away from the display screens 110a and 110b or away from the display screens 110a and 110c), that is, the carrying surface 125 faces the viewer. The prism 122 are disposed on the carrying surface 125. The substrate 121 of the embodiment is, for example, a thin film, but the invention does not limit the specific shape of the substrate 121. In addition, each prism 122 in the embodiment is, for example, an isosceles triangular prism. The vertex angle $\theta p1$ of the isosceles triangular prism is away from the substrate 121, that is, the vertex angle $\theta p1$ is opposite to the substrate 121 and is not connected with the carrying surface 125 of the substrate 121. The angle of the vertex angle $\theta p1$ may be determined according to different design requirements. The width W of the prism 122 is about several tens of micrometers (μm), for example, from 25 μm to 100 μm, such as 50 μm.

Figure 3:
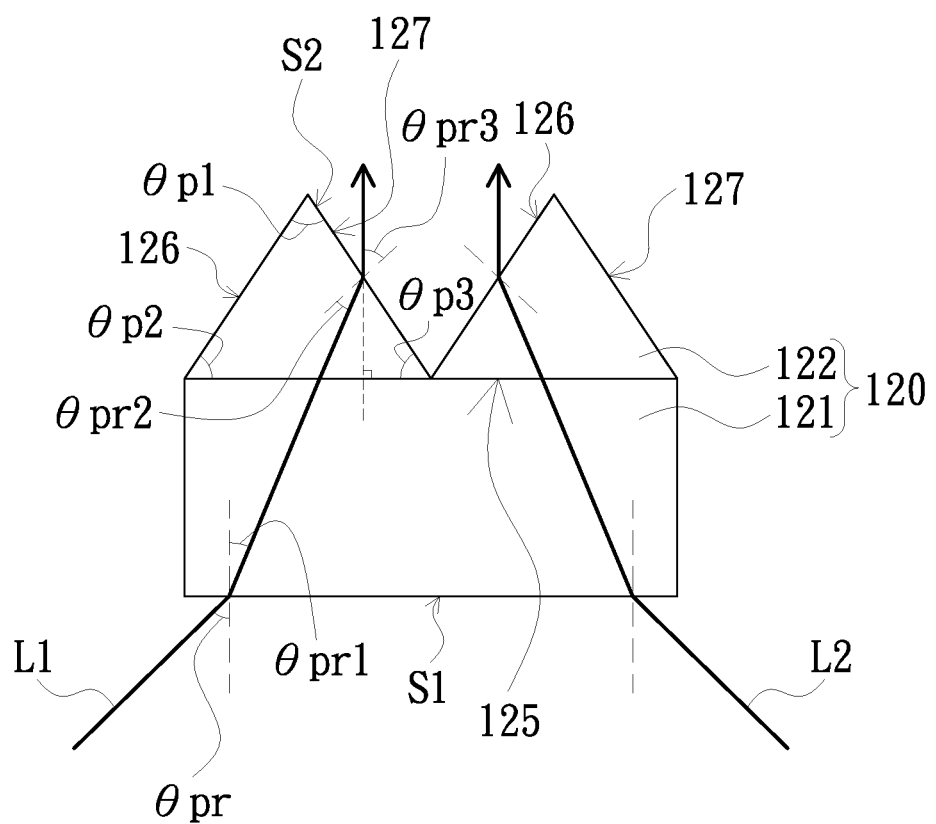
FIG. 3 is a schematic view of a prism-structured optical element and its refracted light in accordance with an embodiment of the invention.

In the following, an embodiment will be given to describe in detail how to design the specific size and the arrangement angle of the prism-structured optical element 120 according to different design requirements, but the invention is not limited thereto. FIG. 3 is a schematic view of a prism-structured optical element and its refracted light in accordance with an embodiment of the invention. Referring to FIG. 3, $\theta pr$ is an incident angle of the light L1 on the interface S1, $\theta p1$ is a vertex angle of the prism 122 (an isosceles triangular prism), $\theta p2$ and $\theta p3$ are the base angles of the prism 122 (an isosceles triangular prism), $\theta pr1$ is the angle of refraction of the light L1 passing through the interface S1, $\theta pr2$ is an incident angle of the light L1 on the interface S2, $\theta pr3$ is the angle of refraction of the light L1 passing through the interface S2, Np is the refractive index of the prism-structured optical element 120, and Na is the refractive index of air. It is assumed that $\theta pr$ is the angle at which the light L1 can forward emit (the light L1 exits the carrying surface 125 perpendicularly) after being refracted by the prism-structure optical element 120.

Since the prism 122 is an isosceles triangular prism, $\theta p2=\theta p3$, $\theta p1=180-\theta p2-\theta p3$, and therefore $\theta p3=(180-\theta p1)/2$.

In addition, $\theta pr3=\theta p3$, and $Np \times \sin(\theta pr2)=Na \times \sin(\theta pr3)$ according to Snell's Law, therefore, $\theta pr2=a\ \sin(Na \times \sin(\theta pr3)/Np)$.

In addition, $\theta pr1=\theta p3-\theta pr2$, and $Np \times \sin(\theta pr1)=Na \times \sin(\theta pr)$ according to Snell's law, therefore, $\theta pr=a\ \sin(Np \times \sin(\theta pr1)/Na)$.

Summing up the above equations, it is given that $\theta pr=a\ \sin(Np \times \sin(180-\theta p1)/2-(a\ \sin(Na \times \sin(180-\theta p1)/2)/Np)))/Na)$. When $\theta p1=90$ degrees, $Na=1$, $Np=1.52$, and therefore $\theta pr$ is 26.8 degrees.

Figure 4A:
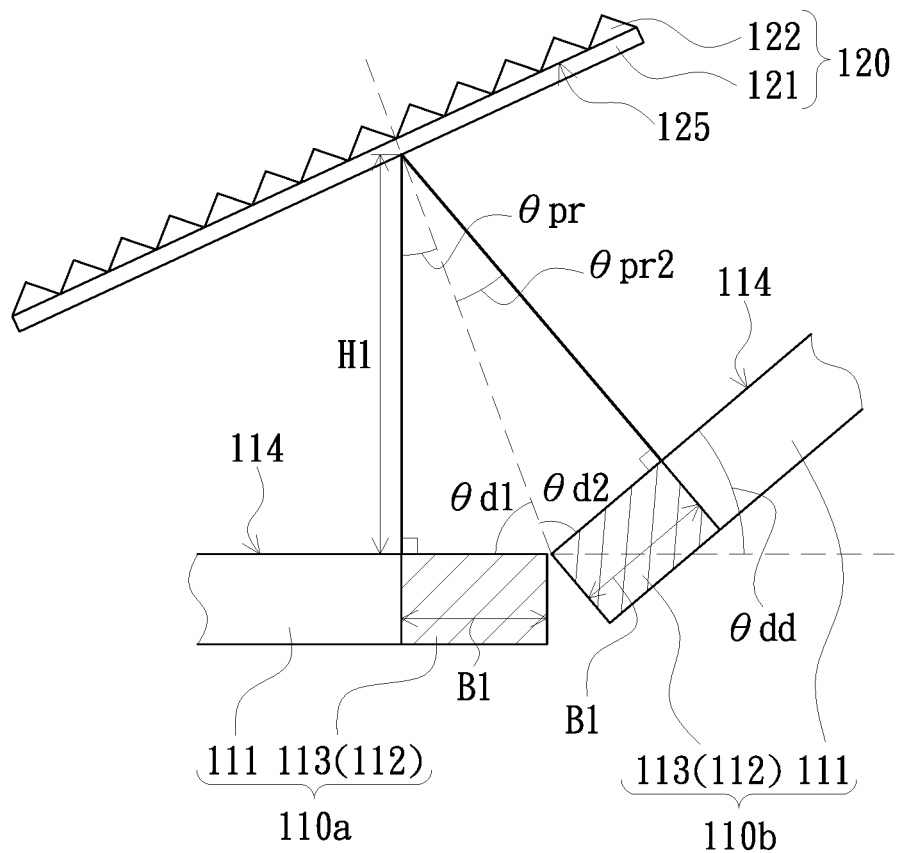
FIGS. 4A and 4B are schematic views of the size and the arrangement angle of a designed prism-structured optical element in accordance with an embodiment of the invention.
Figure 4B:
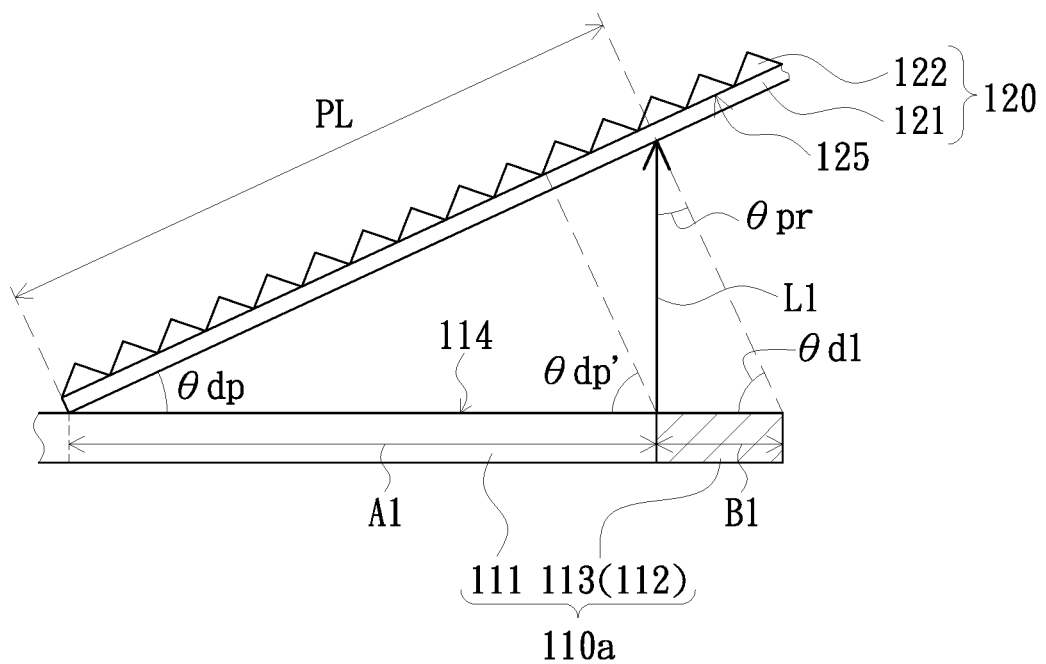

Based on the above deduction, if the forward light of the part of the display area 111 covered by the prism-structure optical element 120 (the light exiting the display area 111 perpendicularly) in FIG. 1 enters the prism-structure optical element 120 at the angle $\theta pr$, the forward light can also forward emit (the light exiting the carrying surface 125 perpendicularly) after being refracted by the prism-structured optical element 120. Based on such conditions, the size and the arrangement angle of the prism-structured optical element 120 can be further deduced. FIGS. 4A and 4B are schematic views of the size and the arrangement angle of a designed prism-structured optical element in accordance with an embodiment of the invention. In FIGS. 4A and 4B, $\theta d1$ is the included angle between the display screen 110a and the normal direction of the carrying surface 125 of the substrate 121 of the prism-structured optical element 120, $\theta d2$ is the included angle between the display screen 110b and the normal direction of the carrying surface 125 of the substrate 121 of the prism-structured optical element 120, $\theta dp$ is the included angle between the display screen 110a and the prism-structured optical element 120, B1 is the width of the side edge 113 of the border 112 of the display screen 110a, 110b, A1 is the width of the display area 111 of the display screen 110a covered by the prism-structured optical element 120, PL is a half of the width of the prism-structured optical element 120, $\theta dd$ is the included angle between the light exit surface 114 of the display area 111 of the display screen 110b and the light exit surface 114 of the display area 111 of the display screen 110a, $\theta dp'$ is the included angle between the normal direction of the carrying surface 125 of the substrate 121 of the prism-structured optical element 120 and the light exit surface 114 of the display area 111 of the display screen 110a, and H1 is the distance from the junction of the display area 111 and the side edge 113 of the display screen 110a to the prism-structured optical element 120 in the normal direction of the display area 111. From FIGS. 4A and 4B, it can be obtained that $\theta d1=90-\theta pr$, $H1=B1/\tan(\theta pr)$, $\theta dd=180-\theta d1-\theta d2$, $\theta dp'=90-\theta pr$, $\theta dp=90-\theta dp'$, $A1=H1/\tan(\theta dp)$ and $PL=A1/\cos(\theta dp)$. It follows that $\theta dd=2 \times \theta pr$, $A1=B1/\tan(\theta pr)^2$ and $PL=B1\ \tan(\theta pr)^2/\cos(\theta pr)$. In an embodiment, if B1 is 4 mm and $\theta pr$ is 26.8 degrees, it can be deduced that $\theta dd$ is 53.6 degrees, A1 is 15.68 mm and PL is 17.57 mm.

According to the above embodiments, the invention can design various prism-structured optical elements that meet different design requirements according to the specifications of each display screen, the material of the prism-structured optical element and the shape and angle of the prism. As shown in FIG. 3, if the light L1 is the light exiting forward from the display area 111 of the display screen 110a in FIG. 4A and the light L2 is the light exiting forward from the display area 111 of the display screen 110b in FIG. 4A, with reference to the above embodiment, it is further designed that the light L2 is also capable of emitting forward (exiting the carrying surface 125 perpendicularly) after passing through the prism-structured optical element 120.

Figure 5:
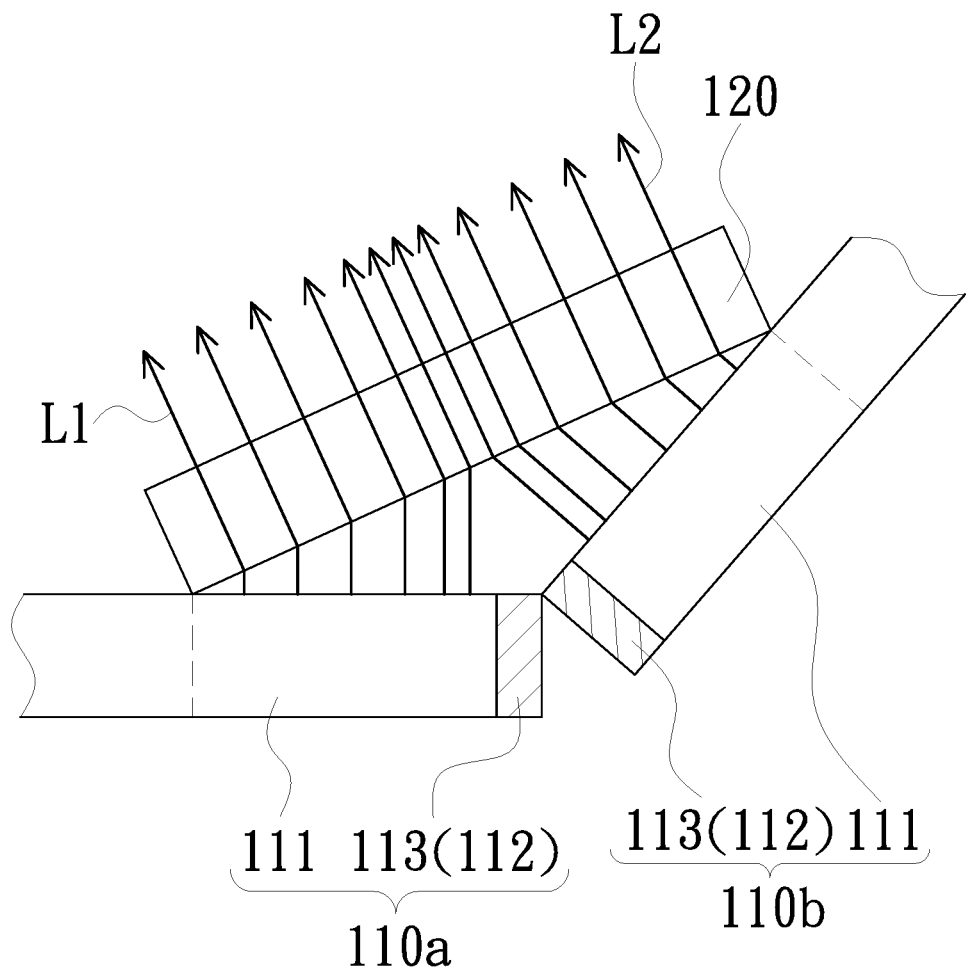
FIG. 5 is a schematic view of the optical path of the forward light of two adjacent display screens passing through the prism-structured optical element in accordance with an embodiment of the invention.

FIG. 5 is a schematic view of the optical path of the forward light of two adjacent display screens passing through the prism-structured optical element in accordance with an embodiment of the invention. Referring to FIG. 5. The prism-structured optical element 120 refracts the lights L1 and L2 that are emitted forward from the display areas 111 of the display screens 110a and 110b, and the lights L1 and L2 can also emit forward after passing through the prism-structured optical element 120. Through the refraction of the prism-structured optical element 120, the area corresponding to the two adjacent side edges 113 of the borders 112 of the two adjacent display screens 110a and 110b also has the lights L1 and L2 transmitted toward the viewer, so that the viewer will not see the two adjacent side edges 113 of the borders 112 of the two adjacent display screens 110a and 110b. Therefore, when the two adjacent display screens 110a and 110b display one image in combination, the viewer can see an image with good splicing without having a display quality affected by the borders 112. Similarly, since the prism-structured optical element 120 is disposed between the two adjacent display screens 110a and 110c in FIG. 1, the display quality is not affected by the borders 112.

Referring to FIGS. 3 and 5. Each prism 122 has two light exit surfaces 126 and 127. Since the light L1 emitted forward from a part of the display area 111 of the display screen 110a covered by the prism-structured optical element 120 exits from the light exit surface 127 of the prism 122, the light exit surface 126 of the prism 122 corresponding to the display area 111 of the display screen 110a is less likely to emit light with higher energy, thus having a problem of low luminance. Moreover, the direction of the light emitted from the light exit surface 126 is different from the direction of the light L1 emitted from the light exit surface 127, and thus the viewer may notice slight ghosting. Similarly, since the light L2 emitted forward from a part of the display area 111 of the display screen 110b covered by the prism-structured optical element 120 exits from the light exit surface 126 of the prism 122, the light exit surface 127 of the prism 122 corresponding to the display area 111 of the display screen 110b is less likely to emit light with higher energy, thus having a problem of low luminance. Moreover, the direction of the light emitted from the light exit surface 127 is different from the direction of the light L2 emitted from the light exit surface 126, and thus the viewer may notice slight ghosting.

Figure 6:
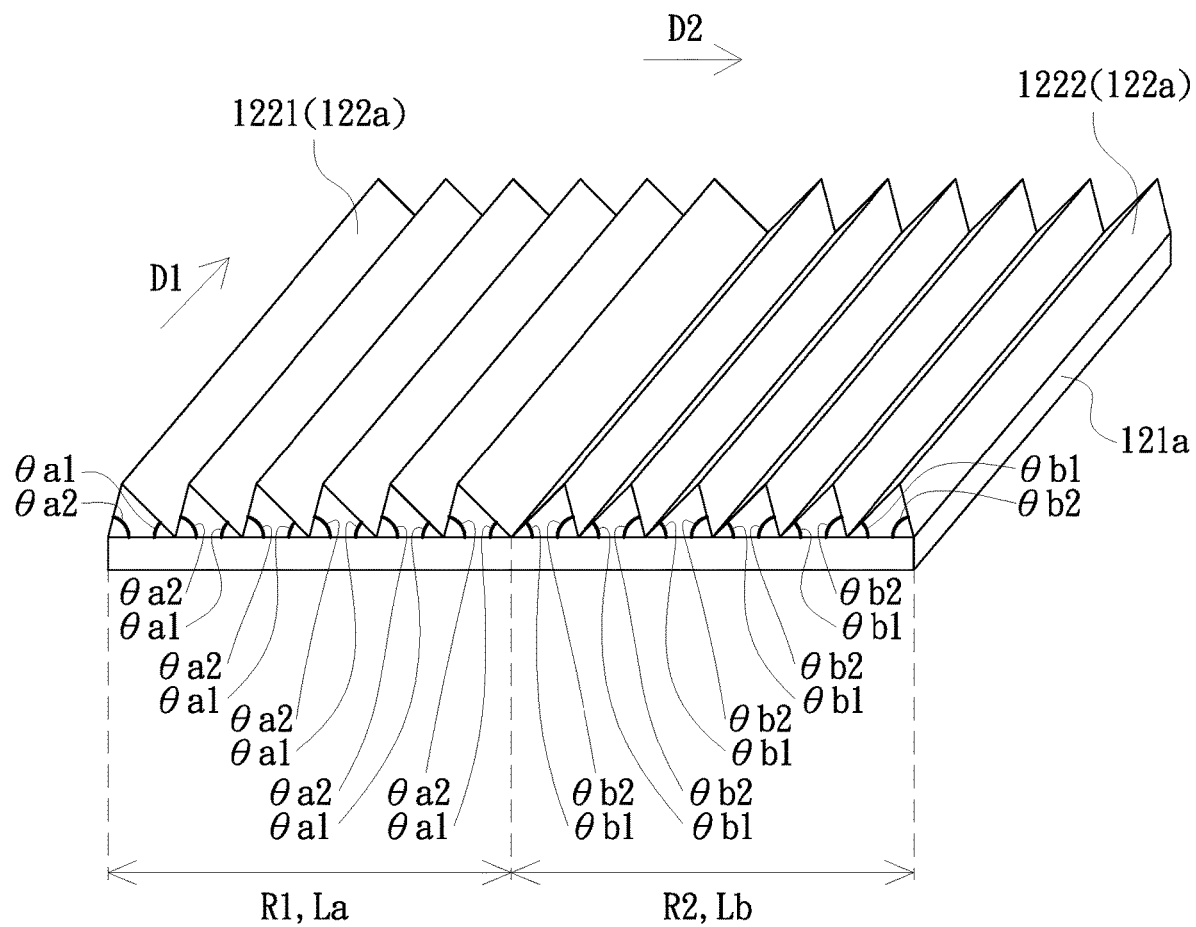
FIG. 6 is a schematic view of a prism-structured optical element of a multi-screen display device in accordance with another embodiment of the invention.
Figure 7:
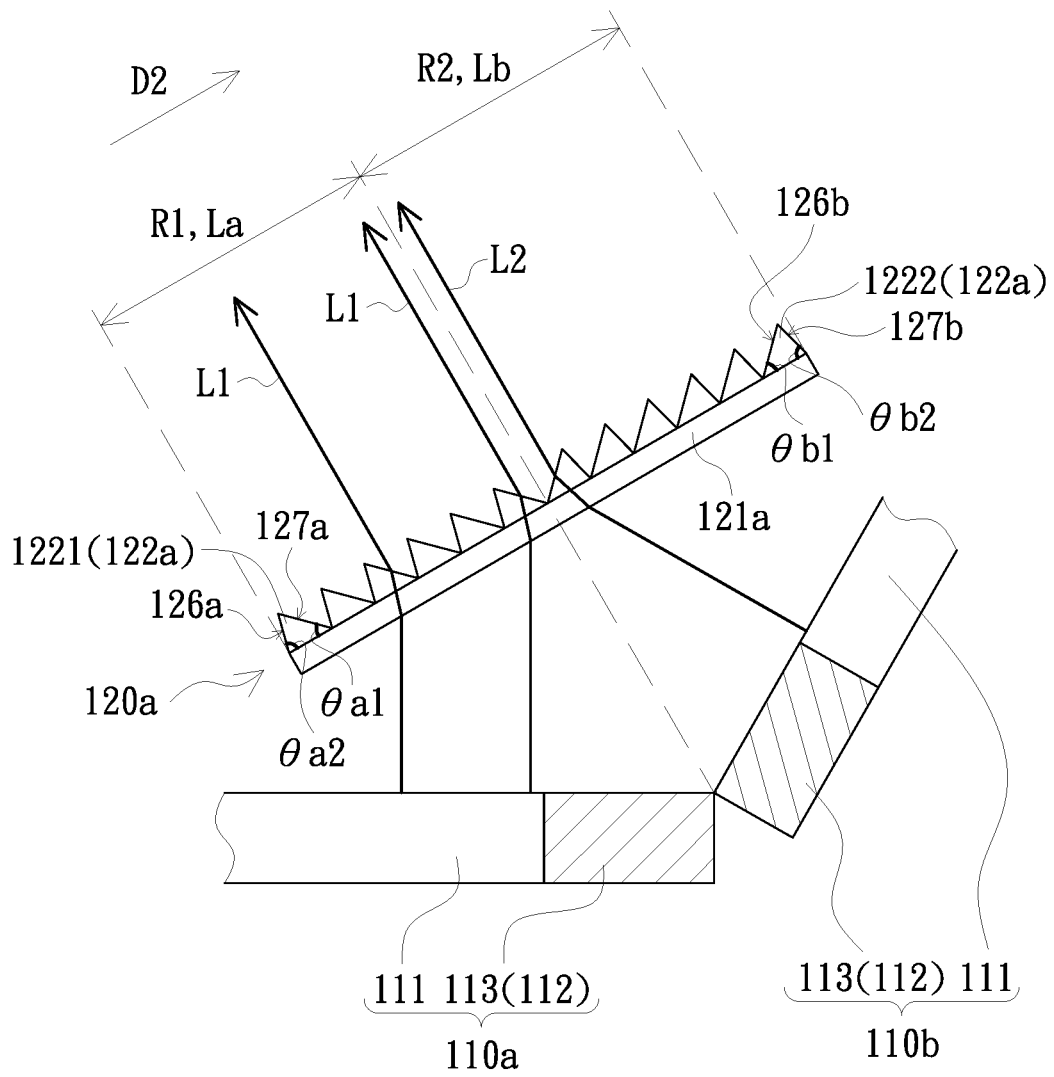
FIG. 7 is a schematic view illustrating that the prism-structured optical element of FIG. 6 refracts light.

In order to improve the above problem, another embodiment of the invention provides a prism-structured optical element. FIG. 6 is a schematic view of a prism-structured optical element of a multi-screen display device in accordance with another embodiment of the invention, and FIG. 7 is a schematic view illustrating that the prism-structured optical element of FIG. 6 refracts light. Referring to FIG. 6 first. The prism-structured optical element 120a of the embodiment is similar to the prism-structured optical element 120 described above, and only the main difference will be described below. The prism-structured optical element 120a includes a substrate 121a and a plurality of prisms 122a. The prisms 122a are arranged on the substrate 121a in a predetermined direction D2. The extending direction D1 of each prism 122a is substantially parallel to the two adjacent side edges 113 in FIG. 1. The substrate 121a includes a first region R1 and a second region R2 adjacent to each other and corresponding to parts of the two display screens 110a and 110b or 110a and 110c respectively in FIG. 1. The length of the first region R1 in the predetermined direction D2 is La, the length of the second region R2 in the predetermined direction D2 is Lb, and La≥Lb, wherein FIG. 6 is taken La=Lb as an example. In addition, the prisms 122a include a plurality of first prisms 1221 arranged in the first region R1 and a plurality of second prisms 1222 arranged in the second region R2. Each of the first prisms 1221 has two interior angles θa1 and θa2 adjacent to the substrate 121a. The interior angle θa1 is located between the interior angle θa2 and the second region R2, and θa1<θa2. Each of the second prisms 1222 has two interior angles θb1 and θb2 adjacent to the substrate 121b. The interior angle θb1 is located between the interior angle θb2 and the first region R1, and θb1<θb2.

In the embodiment, the first region R1 of each prism-structured optical element 120a is, for example, corresponding to the display screen 110a which is the middle display screen among the display screens 110a, 110b and 110c in FIG. 1. In addition, the prism 122a is, for example, a triangular prism. The interior angles θa1, θa2, θb1 and θb2 satisfy the following equations: 40°≤θa1<60°, 60°≤θa2≤90°, 40°≤θb1<60° and 60°≤θb2≤90°. In an embodiment, θa1=θb1=45° and θa2=θb2=71°, for example.

In the first prism 1221, by designing the interior angle θa2 to be larger than the interior angle θa1, the orthographic projection area of the light exit surface 127a adjacent to the interior angle θa1 on the substrate 121a is larger than the orthographic projection area of the light exit surface 126a adjacent to the interior angle θa2 on the substrate 121a. Therefore, most of the light L1 emitted forward from the display area 111 of the display screen 110a can exit from the light exit surface 127a, and thus not only increasing the luminance but also improving the gosting caused by the light exiting from the light exit surface 126a. Similarly, in the second prism 1222, by designing the interior angle θb2 to be larger than the interior angle θb1, the orthographic projection area of the light exit surface 126b adjacent to the interior angle θb1 on the substrate 121a is larger than the orthographic projection area of the light exit surface 127b adjacent to the interior angle θb2 on the substrate 121a. Therefore, most of the light L2 emitted forward from the display area 111 of the display screen 110b can exit from the light exit surface 126b, and thus not only increasing the luminance but also improving the gosting caused by the light exiting from the light exit surface 127b.

Figure 8:
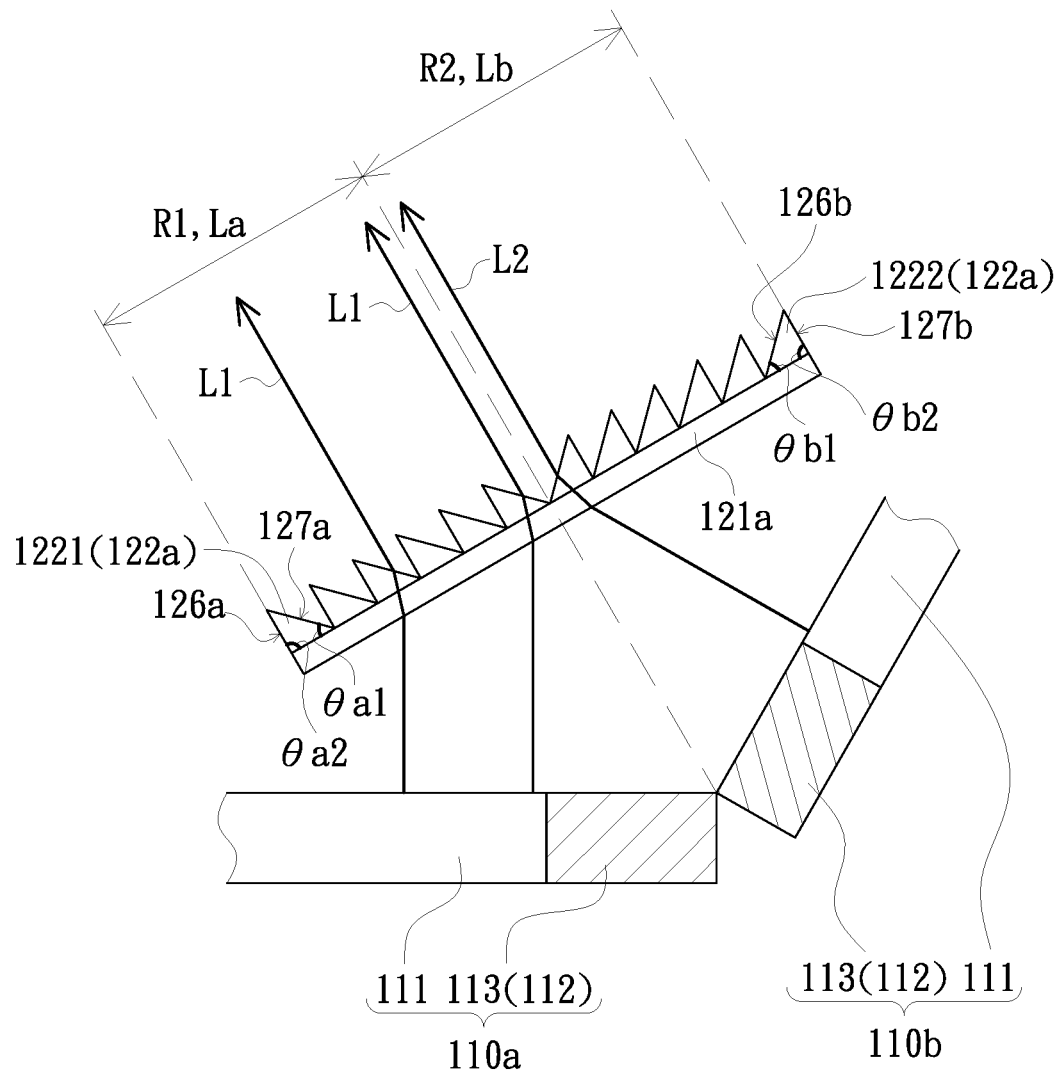
FIG. 8 is a schematic view of refraction of light by a prism-structured optical element of a multi-screen display device in accordance with another embodiment of the invention.

In an embodiment as shown in FIG. 8, by causing θa1=θb1=45° and θa2=θb2=90°, the orthographic projection of the light exit surface 127a adjacent to of the interior angle θa1 on the substrate 121a may substantially cover the entire first region R1, and the orthographic projection of the light exit surface 126b adjacent to of the interior angle θb1 on the substrate 121a may substantially cover the entire second region R2. Therefore, almost all the light L1 emitted forward from the display area 111 of the display screen 110a can exit from the light exit surface 127a, and thus not only increasing the luminance but also improving the gosting caused by the light exiting from the light exit surface 127b. Almost all the light L2 emitted forward from the display area 111 of the display screen 110b can exit from the light exit surface 126b, and thus not only increasing the luminance but also improving the gosting caused by the light exiting from the light exit surface 127b.

Figure 9:
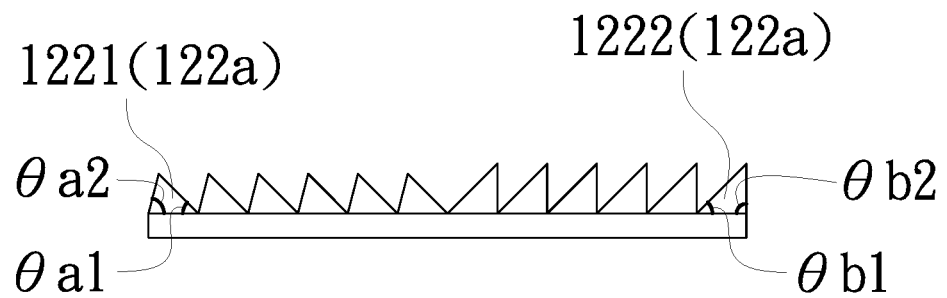
FIG. 9 is a schematic view of a prism-structured optical element of a multi-screen display device in accordance with another embodiment of the invention.

Although the embodiments of FIGS. 6 to 8 are exemplified by that the angles of the interior angles θa2 and θb2 are the same, the angles of the interior angles θa2 and θb2 may be different in other embodiments. For example, as shown in FIG. 9, the interior angles θa1, θa2, θb1 and θb2 satisfy the following equations: 40°≤θa1<60°, 60°≤θa2≤75°, 40°≤θb1<60°, 75°≤θb2≤90° and θa2<θb2. In an embodiment, θa1=θb1=45°, θa2=71°, and θb2=90° for example. In another embodiment, Θa1=θb1=51.5°, θa2=69°, and θb2=90° for example.

Figure 10:
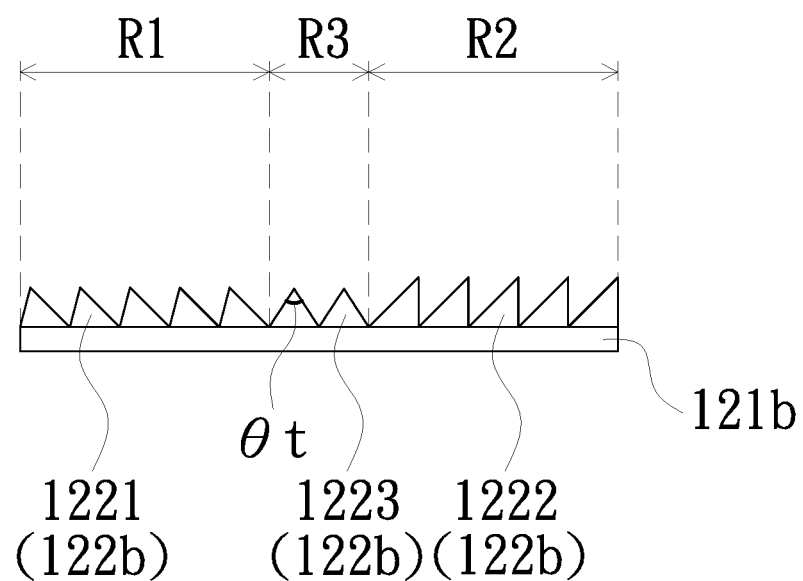
FIG. 10 is a schematic view of a prism-structured optical element of a multi-screen display device in accordance with another embodiment of the invention.

FIG. 10 is a schematic view of a prism-structured optical element in accordance with another embodiment of the invention. Referring to FIG. 10. The prism-structured optical element 120b of the embodiment is similar to that of FIG. 9, and the main difference lies in that the substrate 121b of the prism-structured optical element 120b further includes a third region R3 located between the first region R1 and the second region R2. The length of the third region R3 in the predetermined direction D2 is Lc, wherein Lc<Lb≤La. The third region R3 corresponds to the two adjacent side edges 113 of the borders 112 of the two display screens 110a and 110b or 110a and 110c shown in FIG. 1. In addition including the plurality of first prisms 1221 arranged in the first region R1 and the plurality of second prisms 1222 arranged in the second region R2, the prism-structured optical element 120b further include a plurality of third prisms 1223 arranged in the third region R3 in the predetermined direction D2. Each third prism 1223 is an isosceles triangular prism, and a vertex angle θt of each third prism 1223 is away from the substrate 121b.

Since the third prism 1223 disposed between the first prism 1221 and the second prism 1222 is an isosceles triangular prism, the forward light emitted from any one of the two adjacent display screens can be refracted to the direction toward the viewer. Thus, when the relative position between the prism-structured optical element 120b and the two adjacent display screens is slightly shifted due to the assembly tolerance, the two adjacent display screens is still able to display an image with good splicing.

Figure 11:
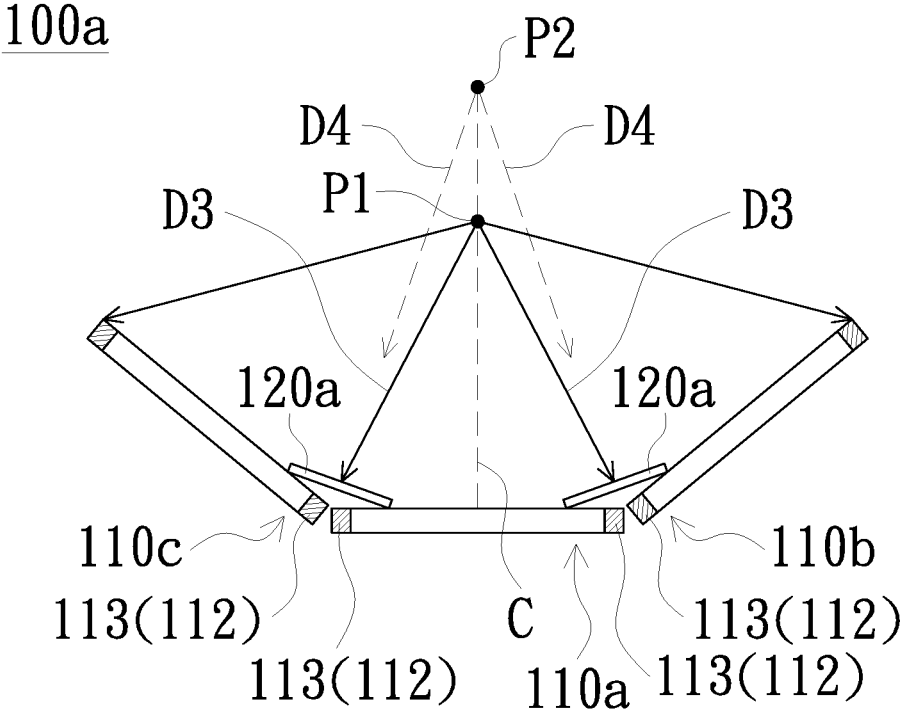
FIG. 11 is a schematic view of a multi-screen display device in accordance with another embodiment of the invention
Figure 12A:
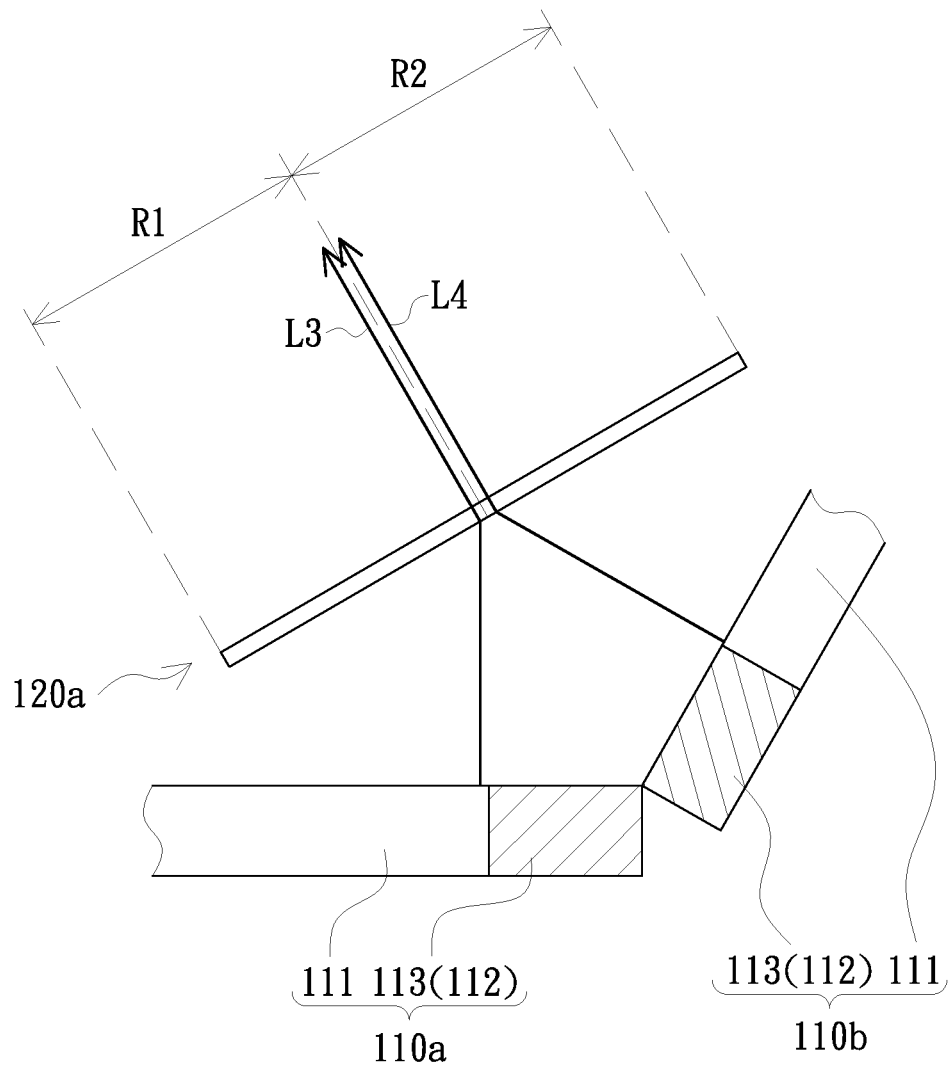
FIG. 12A is a schematic view of the partial optical path while a viewer is at the viewing position P1 in FIG. 11.
Figure 12B:
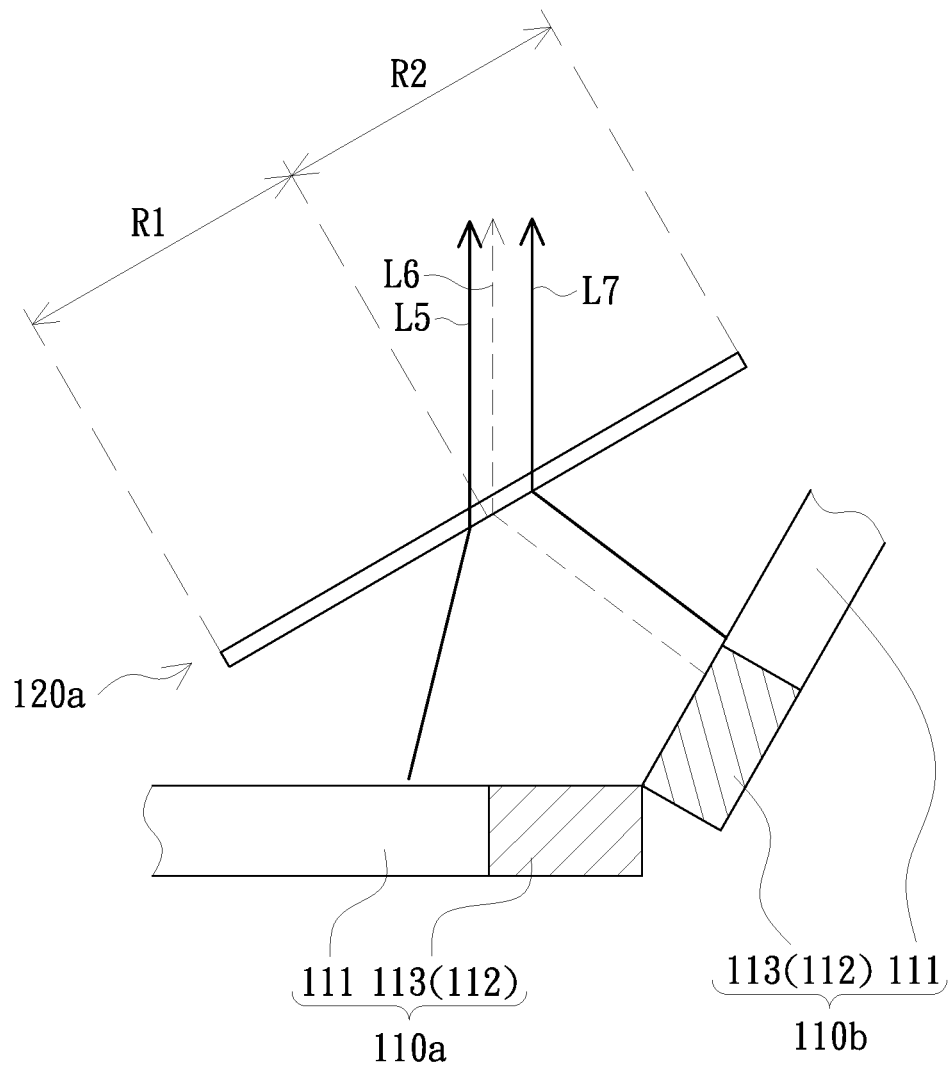
FIG. 12B is a schematic view of the partial optical path while a viewer is at the viewing position P2 in FIG. 11.

FIG. 11 is a schematic view of a multi-screen display device in accordance with another embodiment of the invention. FIG. 12A is a schematic view of the partial optical path while a viewer is at the viewing position P1 in FIG. 11, and FIG. 12B is a schematic view of the partial optical path while a viewer is at the viewing position P2 in FIG. 11. Referring to FIGS. 11 and 12A first. The multi-screen display device 100a of the embodiment adopts two prism-structured optical elements 120a of FIG. 6 and a preferred viewing position P1 is on the center line C of the display screen 110a. When the viewer is at the viewing position P1, the lights L3 and L4 in FIG. 12A are substantially parallel to the viewing direction D3 of the viewer in FIG. 11. In other words, the viewer receives the lights L3 and L4, wherein the light L3 is from the display area 111 of the display screen 110a and is refracted to the viewer via a part of the first region R1 of the prism-structured optical element 120a adjacent to the second region R2, and the light L4 is from the display area 111 of the display screen 110b and is refracted to the viewer via a part of the second region R2 of the prism-structured optical element 120a adjacent to the first region R1. Therefore, even if the viewer looks at the junction of the first region R1 and the second region R2, the two adjacent side edges 113 of the borders 112 of the display screens 110a and 110b will not be seen.

Referring to FIGS. 11 and 12B. When the viewer is at a viewing position P2 further away from the display screen 110a, the viewing direction changes and the lights L5, L6 and L7 in FIG. 12B are substantially parallel to the viewing direction D4 of the viewer in FIG. 11. In other words, the viewer receives the lights L5, L6 and L7, wherein the light L5 is from the display area 111 of the display screen 110a and is refracted to the viewer via a part of the first region R1 of the prism-structured optical element 120a adjacent to the second region R2, and the light L7 is from the display area 111 of the display screen 110b and is refracted to the viewer via the second region R2 of the prism-structured optical element 120a. However, the light L7 is from the edge of the display area 111 of the display screen 110b, but is not refracted to the viewer via a part of the second region R2 of the prism-structured optical element 120a adjacent to the first region R1. The light L6 refracted to the viewer via a part of the second region R2 of the prism-structured optical element 120 adjacent to the first region R1 is from the side edge 113 of the border 112 of the display screen 110b adjacent to the display screen 110a, so the viewer may see the side edge 113 of the border 112 of the display screen 110b adjacent to the display screen 110a. Similarly, the viewer may see the side edge 113 of the border 112 of the display screen 110c adjacent to the display screen 110a.

Figure 13:
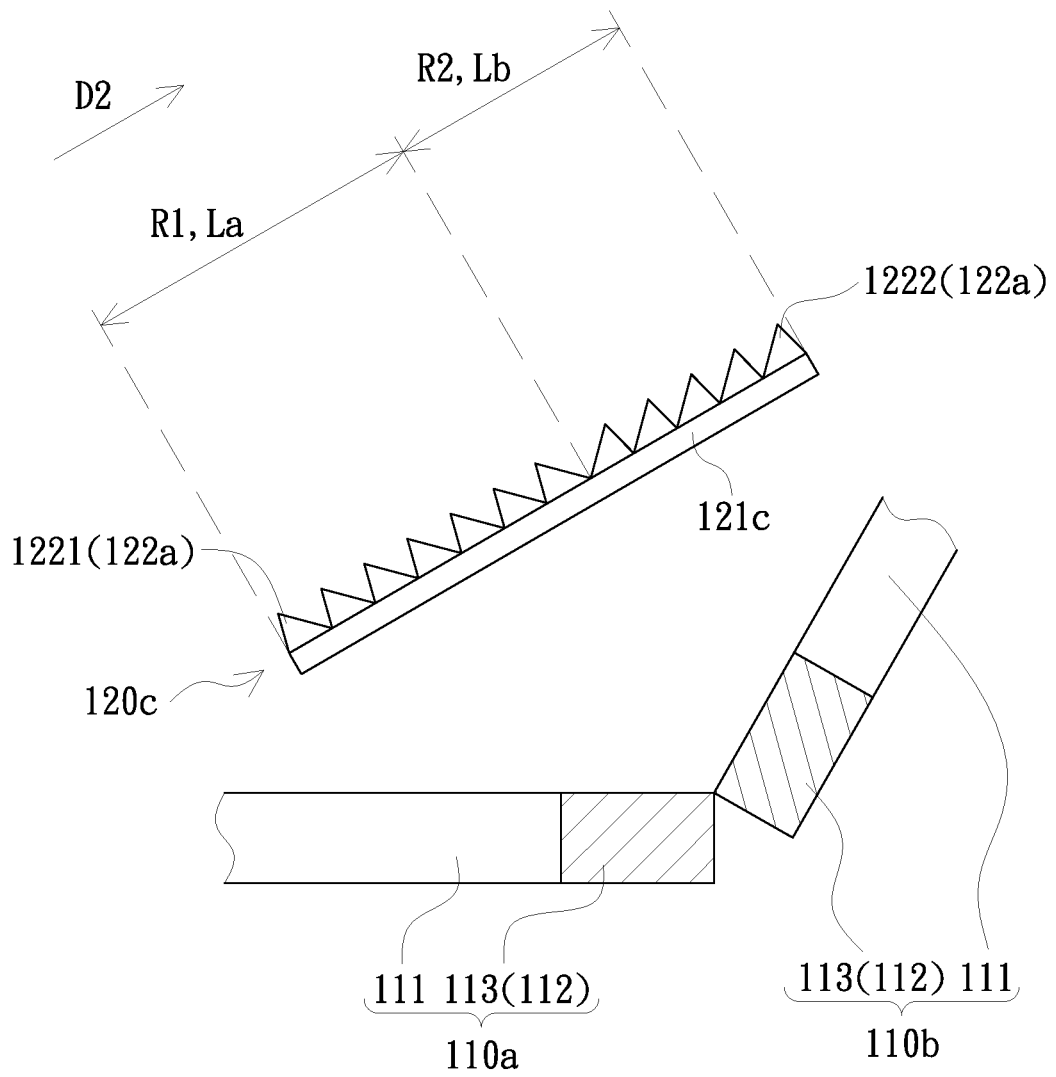
FIG. 13 is a schematic view of refraction of light by a prism-structured optical element of a multi-screen display device in accordance with another embodiment of the invention.

In order to improve the above problem, as shown in FIG. 13, the length La of the first region R1 of the substrate 121c of the prism-structured optical element 120c in the predetermined direction D2 may be designed to be greater than the length Lb of the second region R2 in the predetermined direction D2; and in addition corresponding to a part of one of the two display screens 110a and 110b, the first region R1 also corresponds to a part of the other one of the two display screens 110a and 110b. Taking FIG. 13 as an example. When the prism-structured optical element 120c covers the display screens 110a and 110b, in addition corresponding to a part of the display screen 110a, the first region R1 also corresponds to a part of the display screen 110b. Similarly, when the prism-structured optical element 120c covers the display screens 110a and 110c in FIG. 11, in addition corresponding to a part of the display screen 110a, the first region R1 also corresponds to a part of the display screen 110c. In an embodiment, the length La and the length Lb satisfy, for example, the following equations: 1<La/Lb≤1.2.

Figure 14A:
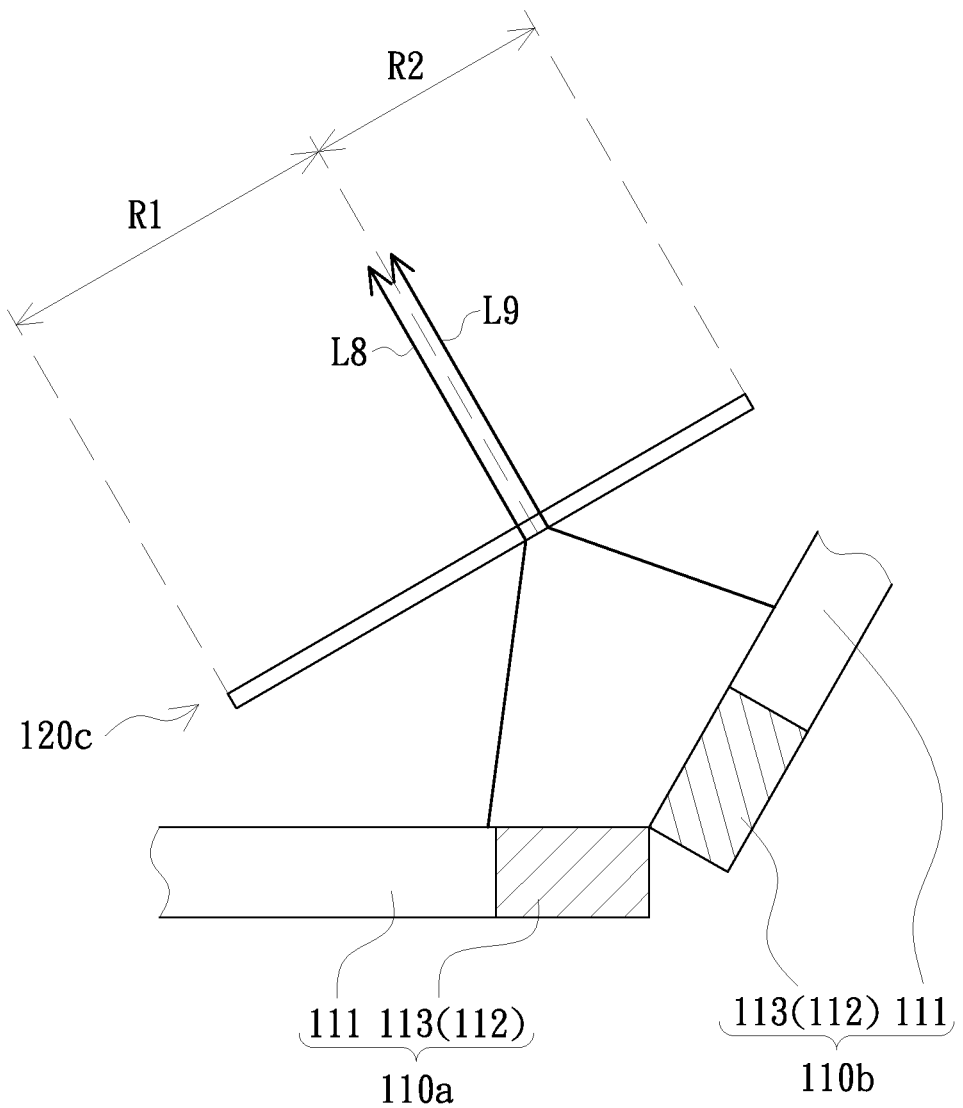
FIG. 14A is a schematic view of the partial optical path while a viewer sees the display device at a preferred viewing position in FIG. 13.
Figure 14B:
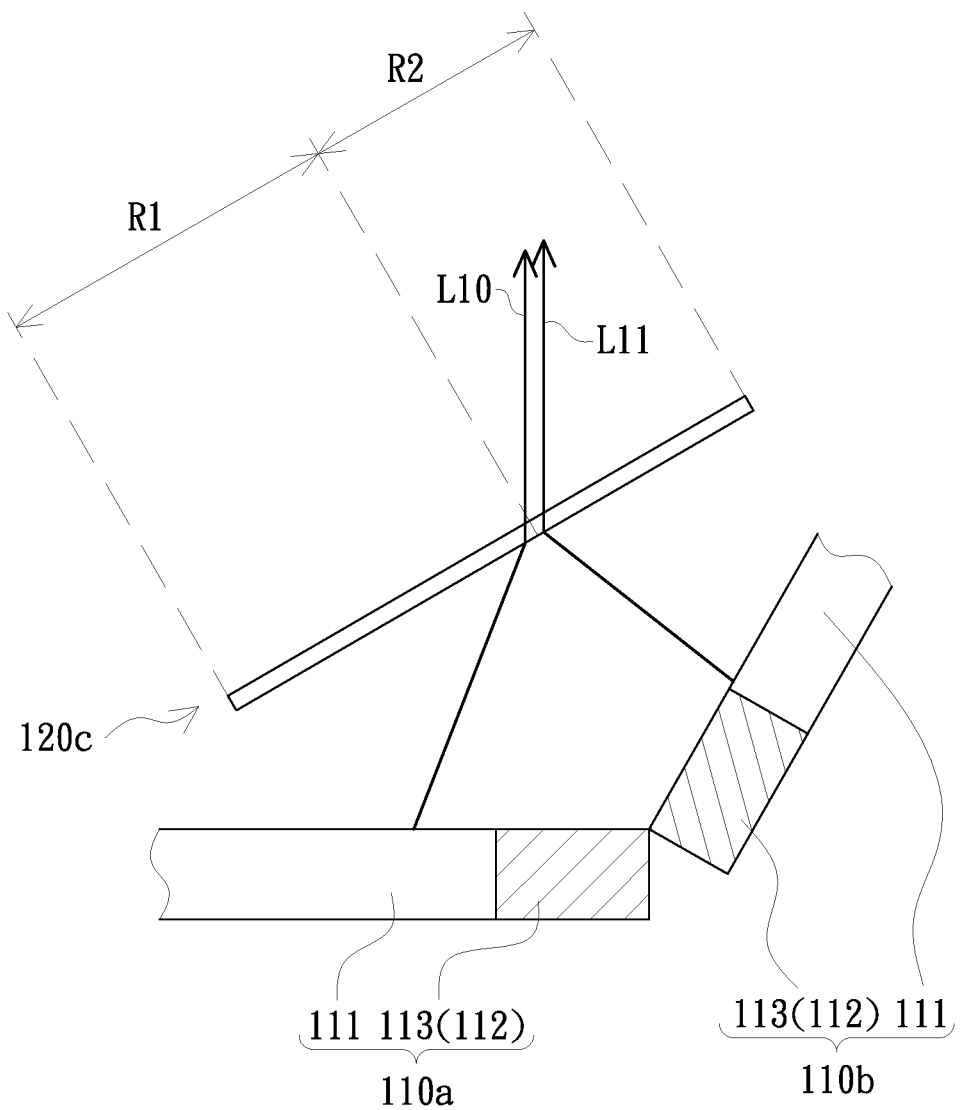
FIG. 14B is a schematic view of the partial optical path while a viewer sees the display device at a farther viewing position in FIG. 13.

FIG. 14A is a schematic view of the partial optical path while a viewer sees the display device at a preferred viewing position in FIG. 13, and FIG. 14B is a schematic view of the partial optical path while a viewer sees the display device at a farther viewing position in FIG. 13. Referring to FIG. 14A first. When the viewer is at a preferred viewing position, the lights L8 and L9 in FIG. 14A are substantially parallel to the viewing direction of the viewer. In other words, the viewer receives the lights L8 and L9, wherein the light L8 is from the display area 111 of the display screen 110a and is refracted to the viewer via a part of the first region R1 of the prism-structured optical element 120c adjacent to the second region R2, and the light L9 is from the display area 111 of the display screen 110b and is refracted to the viewer via a part of the second region R2 of the prism-structured optical element 120a adjacent to the first region R1. Therefore, even if the viewer looks at the junction of the first region R1 and the second region R2, the two adjacent side edges 113 of the borders 112 of the display screens 110a and 110b will not be seen.

Referring to FIG. 14B. When the viewer is farther away from the display screen 110a than the above preferred viewing position, the viewing direction changes and the lights L10 and L11 in FIG. 14B are substantially parallel to the viewing direction of the viewer. In other words, the viewer receives the lights L10 and L11, wherein the light L10 is from the display area 111 of the display screen 110a and is refracted to the viewer via a part of the first region R1 of the prism-structured optical element 120a adjacent to the second region R2, and the light L11 is from the display area 111 of the display screen 110b and is refracted to the viewer via the second region R2 of the prism-structured optical element 120a. Therefore, even if the viewer looks at the junction of the first region R1 and the second region R2, the two adjacent side edges 113 of the borders 112 of the display screens 110a and 110b will not be seen.

Figure 15:
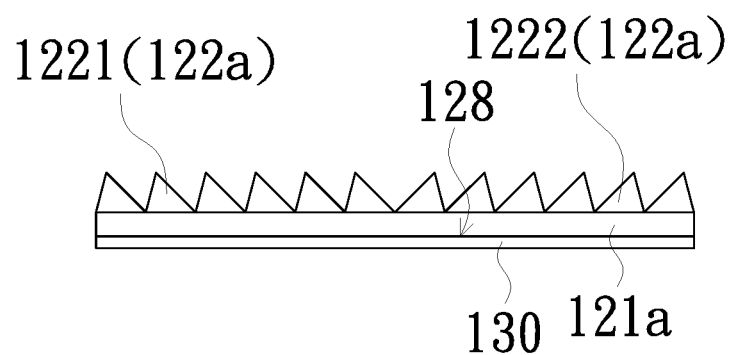
FIG. 15 is a schematic view of a prism-structured optical element of a multi-screen display device in accordance with another embodiment of the invention.

FIG. 15 is a schematic view of a prism-structured optical element of a multi-screen display device in accordance with another embodiment of the invention. Referring to FIG. 15. The prism-structured optical element 120d of the embodiment is similar to the prism-structured optical element 120a of FIG. 6 and the main difference lies in that that the prism-structured optical element 120d further includes a polarizer absorbing material layer 130 disposed on the substrate 121a. For example, the polarizer absorbing material layer 130 is disposed on the surface 128 of the substrate 121a away from the prism 122a for example. In other embodiments, the polarizer absorbing material layer 130 may be disposed between the prism 122a and the substrate 121a. The polarizer absorbing material layer 130 can reduce the reflected light formed by the ambient light source. If the display screens 110a, 110b and 110c in FIG. 1 are display screens with an upper polarizer (for example, a liquid crystal display), the polarization direction of the polarizer absorbing material layer 130 is the same as the polarization direction of the upper polarizer. In other words, the transmission axis of the polarizer absorbing material layer 130 is parallel to the transmission axis of the upper polarizer. The polarizer absorbing material layer 130 can be applied to the prism-structured optical element in accordance with each embodiment of the invention.

In summary, the multi-screen display device in accordance with the embodiment of the invention has the prism-structured optical element to cover two adjacent side edges of the borders and a part of the display areas of the two adjacent display screens. The prism-structured optical element can direct the light emitted from a part of the display area covered by the prism-structure optical element to the eyes of the viewer, so that the viewer is not easy to notice the borders between the two adjacent display screens and the prism-structured optical element when viewing an image formed by splicing a plurality of display screens, and thus improving the display quality.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A multi-screen display device, comprising:
a plurality of display screens, arranged adjacent to each other, wherein at least one adjacent two of the display screens has an included angle, the included angle is greater than 90 degrees and less than 180 degrees, and each of the display screens has a display area and a border surrounding the display area; and
at least one prism-structure optical element, wherein each of the prism-structure optical elements is disposed between the two adjacent display screens having the included angle and covers two adjacent side edges of the borders of the two display screens and a part of the display areas of the two display screens, wherein each of the prism-structured optical elements comprises a substrate and a plurality of prisms, the prisms are arranged on the substrate in a predetermined direction, an extending direction of each of the prisms is substantially parallel to the two adjacent side edges, the substrate comprises a first region and a second region adjacent to each other and corresponding to a part of the two display screens respectively, a length of the first region in the predetermined direction is La, a length of the second region in the predetermined direction is Lb, La≥Lb, the prisms comprise a plurality of first prisms arranged in the first region and a plurality of second prisms arranged in the second region, each of the first prisms has two interior angles $\theta a1$ and $\theta a2$ adjacent to the substrate, the interior angle $\theta a1$ is located between the interior angle $\theta a2$ and the second region, and $\theta a1 < \theta a2$, each of the second prisms has two interior angle $\theta b1$ and $\theta b2$ adjacent to the substrate, the interior angle $\theta b1$ is located between the interior angle $\theta b2$ and the first region, and $\theta b1 < \theta b2$,
wherein each of the prism-structured optical element corresponding to the adjacent two of the display screens is neither parallel nor perpendicular to the two adjacent display screens,
wherein La>Lb, and the first region corresponds to a part of one of the two display screens and also corresponds to a part of another one of the two display screens, wherein La>Lb is configured to make the two adjacent side edges of the borders of the display screens not be seen.

2. The multi-screen display device according to claim 1, wherein $1 \leq La/Lb \leq 1.2$.

3. The multi-screen display device according to claim 1, wherein the prisms are triangular prisms and $40° \leq \theta a1 < 60°$, $60° \leq \theta a2 \leq 90°$, $40° \leq \theta b1 < 60°$, $60° \leq \theta b2 \leq 90°$.

4. The multi-screen display device according to claim 3, wherein $\theta a1 = \theta b1 = 45°$, $\theta a2 = 71°$, and $\theta b2 = 71°$.

5. The multi-screen display device according to claim 3, wherein $\theta a1 = \theta b1 = 45°$, $\theta a2 = 90°$, and $\theta b2 = 90°$.

6. The multi-screen display device according to claim 1, wherein the prisms are triangular prisms and $40° \leq \theta a1 < 60°$, $60° \leq \theta a2 \leq 75°$, $40° \leq \theta b1 < 60°$, $75° \leq \theta b2 \leq 90°$, $\theta a2 < \theta b2$.

7. The multi-screen display device according to claim 6, wherein $\theta a1 = \theta b1 = 45°$, $\theta a2 = 71°$, and $\theta b2 = 90°$.

8. The multi-screen display device according to claim 6, wherein $\theta a1 = \theta b1 = 51.5°$, $\theta a2 = 69°$, and $\theta b2 = 90°$.

9. The multi-screen display device according to claim 1, wherein a number of the display screens is three, a number of the at least one prism-structured optical element is two, and the first regions of the prism-structured optical elements correspond to the display screen in the middle of the display screens.

10. A multi-screen display device, comprising:
a plurality of display screens, arranged adjacent to each other, wherein at least one adjacent two of the display screens has an included angle, the included angle is greater than 90 degrees and less than 180 degrees, and each of the display screens has a display area and a border surrounding the display area; and
at least one prism-structure optical element, wherein each of the prism-structure optical elements is disposed between the two adjacent display screens having the included angle and covers two adjacent side edges of the borders of the two display screens and a part of the display areas of the two display screens, wherein each of the prism-structured optical elements comprises a substrate and a plurality of prisms, the prisms are arranged on the substrate in a predetermined direction, an extending direction of each of the prisms is substantially parallel to the two adjacent side edges, the substrate comprises a first region and a second region adjacent to each other and corresponding to a part of the two display screens respectively, a length of the first region in the predetermined direction is La, a length of the second region in the predetermined direction is Lb, $La \geq Lb$, the prisms comprise a plurality of first prisms arranged in the first region and a plurality of second prisms arranged in the second region, each of the first prisms has two interior angles $\theta a1$ and $\theta a2$ adjacent to the substrate, the interior angle $\theta a1$ is located between the interior angle $\theta a2$ and the second region, and $\theta a1 < \theta a2$, each of the second prisms has two interior angle $\theta b1$ and $\theta b2$ adjacent to the substrate, the interior angle $\theta b1$ is located between the interior angle $\theta b2$ and the first region, and $\theta b1 < \theta b2$,
wherein the prisms are triangular prisms and $40° \leq \theta a1 < 60°$, $60° \leq \theta a2 \leq 75°$, $40° \leq \theta b1 < 60°$, $75° \leq \theta b2 \leq 90°$, $\theta a2 < \theta b2$, the substrate further comprises a third region located between the first region and the second region, a length of the third region in the predetermined direction is Lc, $Lc < Lb \leq La$, the third region corresponds to the two adjacent side edges of the borders of the two display screens, the prisms further comprise a plurality of third prisms arranged along the predetermined direction in the third region, each of the third prisms is an isosceles triangular prism, and an apex angle of each of the third prisms is away from the substrate.

11. A multi-screen display device, comprising:
a plurality of display screens, arranged adjacent to each other, wherein at least one adjacent two of the display screens has an included angle, the included angle is greater than 90 degrees and less than 180 degrees, and each of the display screens has a display area and a border surrounding the display area; and
at least one prism-structure optical element, wherein each of the prism-structure optical elements is disposed between the two adjacent display screens having the included angle and covers two adjacent side edges of the borders of the two display screens and a part of the display areas of the two display screens, wherein each of the prism-structured optical elements comprises a substrate and a plurality of prisms, the prisms are arranged on the substrate in a predetermined direction, an extending direction of each of the prisms is substantially parallel to the two adjacent side edges, the substrate comprises a first region and a second region adjacent to each other and corresponding to a part of the two display screens respectively, a length of the first region in the predetermined direction is La, a length of the second region in the predetermined direction is Lb, $La \geq Lb$, the prisms comprise a plurality of first prisms arranged in the first region and a plurality of second prisms arranged in the second region, each of the first prisms has two interior angles $\theta a1$ and $\theta a2$ adjacent to the substrate, the interior angle $\theta a1$ is located between the interior angle $\theta a2$ and the second region, and $\theta a1 < \theta a2$, each of the second prisms has two interior angle $\theta b1$ and $\theta b2$ adjacent to the substrate, the interior angle $\theta b1$ is located between the interior angle $\theta b2$ and the first region, and $\theta b1 < \theta b2$,
wherein each of the prism-structured optical elements further comprises a polarizer absorbing material layer disposed on the substrate, each of the display screens has an upper polarizer, and a polarization direction of the polarizer absorbing material layer is the same as a polarization direction of the upper polarizer.

12. The multi-screen display device according to claim 11, wherein the polarizer absorbing material layer is disposed on a surface of the substrate away from the prisms.

* * * * *